United States Patent [19]

Graves et al.

[11] Patent Number: 4,764,921

[45] Date of Patent: Aug. 16, 1988

[54] METHOD OF MULTIPLEXING DIGITAL SIGNALS

[75] Inventors: Alan F. Graves; Paul A. Littlewood; Johannes S. Weiss, all of Alberta, Canada

[73] Assignee: Northern Telecom Limited, Montreal, Canada

[21] Appl. No.: 797,264

[22] Filed: Nov. 12, 1985

[51] Int. Cl.⁴ ............................................. H04J 3/06
[52] U.S. Cl. ................................. 370/100; 370/110.1
[58] Field of Search ................. 370/100, 101, 89, 102, 370/99; 375/106, 113

[56] References Cited

U.S. PATENT DOCUMENTS

| | | | |
|---|---|---|---|
| 3,995,119 | 11/1976 | Pachynski, Jr. | 370/100 |
| 4,086,537 | 4/1978 | Asakawa et al. | 370/100 |
| 4,143,246 | 3/1979 | Smith | 370/100 |
| 4,507,779 | 2/1985 | Barner, Jr. et al. | 370/100 |
| 4,571,722 | 2/1986 | Bingham et al. | 370/100 |
| 4,607,364 | 8/1986 | Neumann et al. | 370/99 |

Primary Examiner—Douglas W. Olms
Assistant Examiner—Frank M. Scutch, III
Attorney, Agent, or Firm—R. John Haley

[57] ABSTRACT

A multiplexed bit stream consists of interleaved words all of the same number of bits, the words corresponding to respective channels one of which is a synchronizing channel. A predetermined one of the bits of the words is used to identify the synchronizing channel, and may be used in the other, information, channels to carry service-related overhead and signalling information. The bit rate of the multiplexed bit stream is a harmonic of the bit rate of the individual channels. Such but streams can be further multiplexed together in a word-interleaved harmonic manner, whereby a harmonic structure of signals at different levels of multiplexing is built up.

26 Claims, 5 Drawing Sheets

| SUBFRAME | BITS 1-8 | 9 | 10 |
|---|---|---|---|
| 0 | CH. 18 | B | P |
| 1 | CH. 19 | B | P |
| 2 | CH. 20 | B | P |
| 3 | CH. 21 | B | P |
| 4 | CH. 22 | B | P |
| 5 | CH. 23 | B | P |
| 6 | CH. 24 | B | P |
| 7 | CH. 0 | 0 | P |
| 8 | CH. 1 | B | P |
| 9 | CH. 2 | B | P |
| 10 | CH. 3 | B | P |
| 11 | CH. 4 | B | P |
| ⋮ | ⋮ | ⋮ | ⋮ |
| 23 | CH. 16 | B | P |
| 24 | CH. 17 | B | P |

P = PARITY BIT
B = 1, OR VARIABLY 1 AND 0

METHOD OF MULTIPLEXING DIGITAL SIGNALS

This invention relates to a method of multiplexing digital signals.

BACKGROUND OF THE INVENTION

It is well known to multiplex digital signals, for example telephone voice channel signals (so-called DS-0 signals) at a bit rate of 64 kbps (kilobits per second), to produce higher bit rate signals for transmission, for example so-called DS-1, DS-2, and DS-3 signals. Various framing, stuffing, and control schemes are involved in the production of such multiplexed signals. As a result, neither the individual channels nor the multiplexed carriers are accessible in higher bit rate multiplexed signals. For example, DS-0 signals are not accessible in DS-2 and higher level multiplexed signals, and DS-1 signals are not accessible in DS-3 and higher level multiplexed signals. Such signals can only be accessed, for example to be switched, by demultiplexing the higher bit rate signals. This gives rise to extensive and costly multiplexing and demultiplexing equipment throughout present digital communications networks.

An object of this invention, therefore, is to provide an improved method of multiplexing digital signals.

SUMMARY OF THE INVENTION

According to this invention there is provided a method of multiplexing digital signals comprising the steps of: providing t.d.m. frames each consisting of mn time slots each for one bit, where m and n are plural integers, said frames comprising n consecutive time slots for each of m channels; and, in each frame: in a predetermined one of the n time slots for one of the m channels, providing a bit indicating that the channel is a frame synchronizing channel, whereby this frame synchronizing channel is distinguishable from information channels constituted by the other m−1 channels; and providing digital signals in the other n−1 time slots of the m−1 information channels.

It should be noted from the above wording that the term "time slot" is used herein to mean a time period of a time division multiplexed signal for one bit (binary digit) of the signal.

Thus in accordance with this invention a t.d.m. frame has a number of time slots equal to an integral multiple of the number of bits of each channel, and the bit rate of the t.d.m. frame is a harmonic of the channel bit rate, a frame synchronizing channel having the same number of bits as an information channel. Furthermore, a predetermined one of the bits of each channel is used to identify the frame synchronizing channel.

It should be appreciated that, as a result of this, overhead information such as frame synchronizing information does not adversely affect access to lower level signals in relatively higher level multiplexed signals. Accordingly, signals multiplexed in accordance with this invention can be directly accessed within the higher level multiplexed signals without the need for demultiplexing equipment.

Conveniently said bit provided in each frame in the predetermined one of the n time slots of the frame synchronizing channel has a predetermined binary value. This bit could conceivably instead have a binary value which varies in accordance with a predetermined framing pattern, but this is neither necessary nor preferred in view of the need to identify the frame synchronizing channel in a convenient manner.

The method may include the step of providing in each frame in the predetermined one of the n time slots of each information channel a bit having a value different from said predetermined binary value. This provides a particularly easy manner of distinguishing the frame synchronizing channel from the information channels. In this case the method may include the step of providing in each frame a signalling information bit in a further one of the n time slots of each information channel, whereby signalling information for each information channel can be transmitted distinctly from the channel information itself.

Preferably, however, the method includes the step of providing, in successive frames in the predetermined one of the n time slots of each information channel, bits of both binary values constituting overhead information for the respective information channel. This provides a service-related overhead for each information channel, which can be used for end-to-end signalling, service control and verification, and other desirable purposes. In this case preferably the overhead information for each information channel provides one bit every six frames for signalling information relating to the information channel. Conveniently, the overhead information for each information channel can comprise bits in overhead information frames, each overhead information frame having a period which is an integral multiple of the period of six of said t.d.m. frames.

As the other n−1 time slots of the frame synchronizing channel are provided to achieve the harmonic multiplexing structure already referred to, these can be used to carry other information such as signalling frame information.

In view of the existence of numerous channels at the DS-0 (64 kbps) and DS-1 (1.544 Mbps) levels, preferably the t.d.m. frames each have a period of 125 $\mu$s, m=25, and n>8; conveniently n=9 or n=10, the latter case in particular facilitating the provision of a parity bit for each information channel in each frame in a predetermined one of the other n−1 time slots of the respective information channel. This enables 8 bits of a 64 kbps (DS-0) channel to be provided in 8 of said other n−1 time slots of one or more information channels, and facilitates the conversion of a DS-1 bit stream into a compatible multiplexed signal.

The harmonic multiplexing in accordance with this invention can be extended reiteratively to higher levels, and correspondingly higher bit rates.

Thus the invention also extends to a method of multiplexing digital signals comprising the steps of: providing p virtual tributaries each comprising t.d.m. frames of information multiplexed in accordance with the method recited above, where p is a plural integer, all of the virtual tributaries having the same t.d.m. frame period and the same number mn of time slots for m words one per channel, each of n consecutive bits; providing a predetermined synchronizing word as a predetermined one of the m words of a predetermined one of the virtual tributaries constituting a synchronizing information tributary; and multiplexing the p virtual tributaries together, one word from each virtual tributary cyclically in turn, to form a multiplexed superframe of word-interleaved virtual tributaries.

Preferably a plurality of synchronizing words are provided in the synchronizing information tributary. Conveniently the synchronizing information tributary comprises a number of different synchronizing words which is an integral factor of m, the synchronizing words being distributed periodically among the m words of the synchronizing information tributary. For example there are five synchronizing words for the case when m=25, whereby every fifth word of the synchronizing information tributary is a synchronizing word.

Conveniently p=32, this number being selected because it is a power of 2 and so that one multiplexed superframe can accommodate a bit stream at the DS-3 level.

The invention further extends to a method of multiplexing digital signals comprising the steps of: providing a plurality of multiplexed superframes of word-interleaved virtual tributaries multiplexed in accordance with the method recited above; modifying the predetermined synchronizing word of a predetermined one of the multiplexed superframes whereby it is distinguishable from the other synchronizing words; and multiplexing the multiplexed superframes together, one word from each multiplexed superframe cyclically in turn.

BRIEF DESCRIPTION OF THE DRAWINGS

The invention will be further understood from the following description with reference to the accompanying drawings, in which.

DESCRIPTION OF THE PREFERRED EMBODIMENTS

Figure 1:
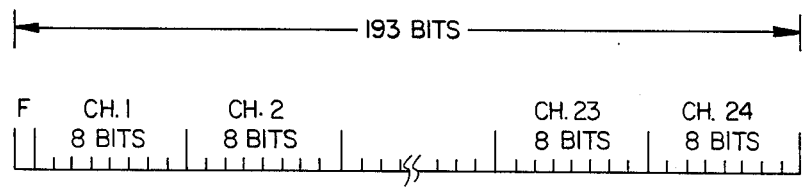
FIG. 1 illustrates one multiplex frame of a known DS-1 bit stream.

Referring to FIG. 1, there is illustrated one multiplex frame of a so-called DS-1 bit stream. As is well known, this bit stream consists of 8 bits from each of 24 channels CH.1 to CH.24 which are time division multiplexed together with a framing bit F to form frames each of 193 (24×8+1=193) bits. The 8 bits of each channel are derived from a so-called DS-0 bit stream having a bit rate of 64 kb/s, and may for example constitute an 8-bit sample of a voice channel signal which is sampled at a rate of 8 kHz and hence with a period of 125 μs. It follows that the DS-1 frame period is also 125 μs, and that the DS-1 bit rate is 1.544 Mb/s (193 bits per 125 μs).

This frame structure, which is extensively used in digital communications networks, has several disadvantages associated with it. In particular, with this frame structure the need to switch services or channels in communications networks generally must be satisfied by demultiplexing DS-1 bit streams to the DS-0 channels, switching the DS-0 channels individually (this is referred to as switching at the DS-0 level), and remultiplexing the switched DS-0 channels to form DS-1 bit streams. Consequently, current communications networks include extensive amounts of multiplexing and demultiplexing equipment.

In addition, because switches in digital communications networks generally delay individual switched DS-0 channels by differing amounts depending upon the exact paths taken through the switch, a significant problem is created in trying to use multiple DS-0 channels to provide services at bit rates which are multiples of 64 kb/s. Thus for example a switched service providing a bit rate of 128 kb/s using two DS-0 channels is difficult to provide. Furthermore, the provision of such higher bandwidth services would necessitate the provision of disproportionately large switch matrices.

These disadvantages stem from the fact that, as a result of the necessary provision of the framing bit F, the number of bits in each DS-1 frame is not an integral multiple of the number of bits in each DS-0 channel. Viewed alternatively, the DS-1 bit rate of 1.544 Mb/s is not an integral multiple, or harmonic, of the DS-0 bit rate of 64 kb/s.

Figure 2:
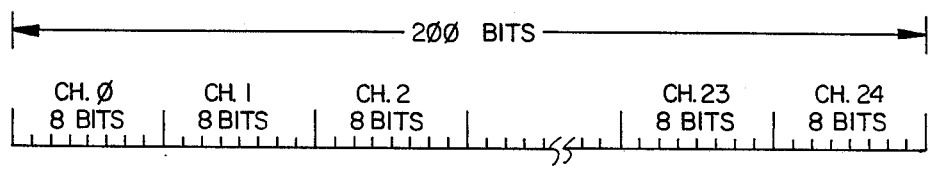
FIG. 2 illustrates one multiplex frame of a modified bit stream.

FIG. 2 illustrates a multiplex frame of a modified bit stream, referred to herein as a synchronous DS-1 bit stream, in which the number of bits is increased from 193 to 200 so that it is a multiple of the number of bits per DS-0 channel. In consequence, with the frame period being fixed at 125 μs, the bit rate of this synchronous DS-1 bit stream is 1.6 Mb/s (200 bits per 125 μs), which is a harmonic of the DS-0 bit rate of 64 b/s. The synchronous DS-1 bit stream of FIG. 2 still accommodates 24 8-bit DS-0 channels Ch.1 to CH.24, but provides an 8-bit channel, channel CH.0, instead of the single framing bit F in FIG. 1.

Figure 3:
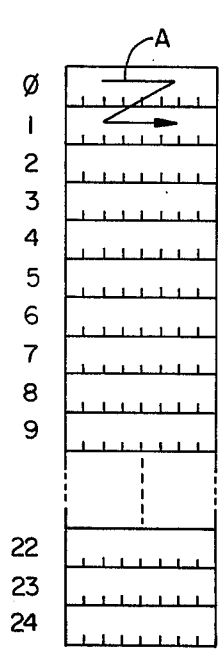
FIG. 3 is an alternative form of illustration of the multiplex frame shown in FIG. 2.

FIG. 3 is an alternative way of illustrating the multiplex frame of FIG. 2. In FIG. 3, the word-interleaved multiplexed channels CH.0 to CH.24 of FIG. 2 are shown vertically stacked, with corresponding numbers 0 to 24 at the left-hand side, to form a column of 8-bit words. An arrow A in FIG. 3 illustrates the sequence of bits in the multiplex frame, i.e. the 8 bits of channel 0 occur first, followed by the 8 bits of channel 1, and so on, the frame ending with the 8 bits of channel 24, this sequence being repeated in successive frames. The frame period is, as described above, 125 μs. It should be noted that this form of illustration of the frame is enabled by the synchronous or harmonic nature of the frame; the conventional DS-1 frame of FIG. 1 can not be similarly represented as a vertical column of channels of constant bit width.

Whilst the above description relates to 8-bit wide channels, i.e. each channel has one word of 8 bits multiplexed into each frame, it may be desirable to be able to provide one or more additional bits associated directly with each DS-0 channel or 64 kb/s service. Examples of the uses of such additional bits are for signalling information on telephone voice channels instead of using bit-robbing or bit-stealing techniques, for control and verification of services (e.g. to establish a desired service bandwidth and to establish the location of faults), and for data integrity checks for example using parity bits. Another use, particularly relating to synchronizing information, is described below.

Figure 4:
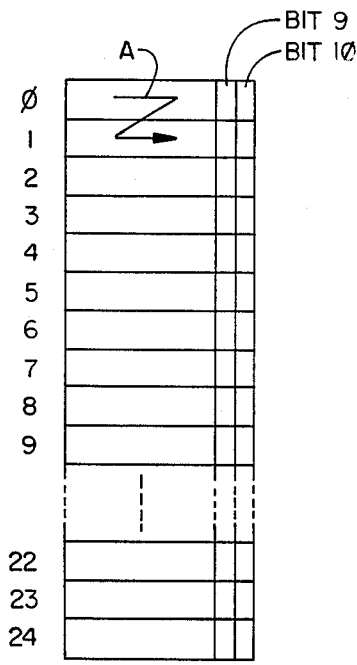
FIG. 4 illustrates one multiplex frame of a further modified bit stream.

In any event, such additional bit(s) can be readily provided, for example as illustrated in FIG. 4 in which each channel in the multiplex frame is provided with two bits, bit 9 and bit 10, which are additional to the original 8-bit words of the channels. As shown by the illustration in FIG. 4, the harmonic nature of the multiplex frame is preserved, the number of bits per channel merely being increased from 8 to 10, with a consequent increase from 200 to 50 bits per frame, and a consequently increased bit rate of 2 Mb/s (250 bits per 125 μs).

A plurality of synchronous DS-1 bit streams of the form shown in FIGS. 2, 3, or 4 may be multiplexed together in a similar harmonic manner to form a higher bandwidth synchronous signal. For example, FIG. 5 illustrates the multiplexing of synchronous DS-1 bit streams, each as shown in FIG. 4 and referred to as a virtual tributary (VT), into a higher bandwidth synchronous signal comprising 32 tributaries VT0 to VT31.

Figure 5:
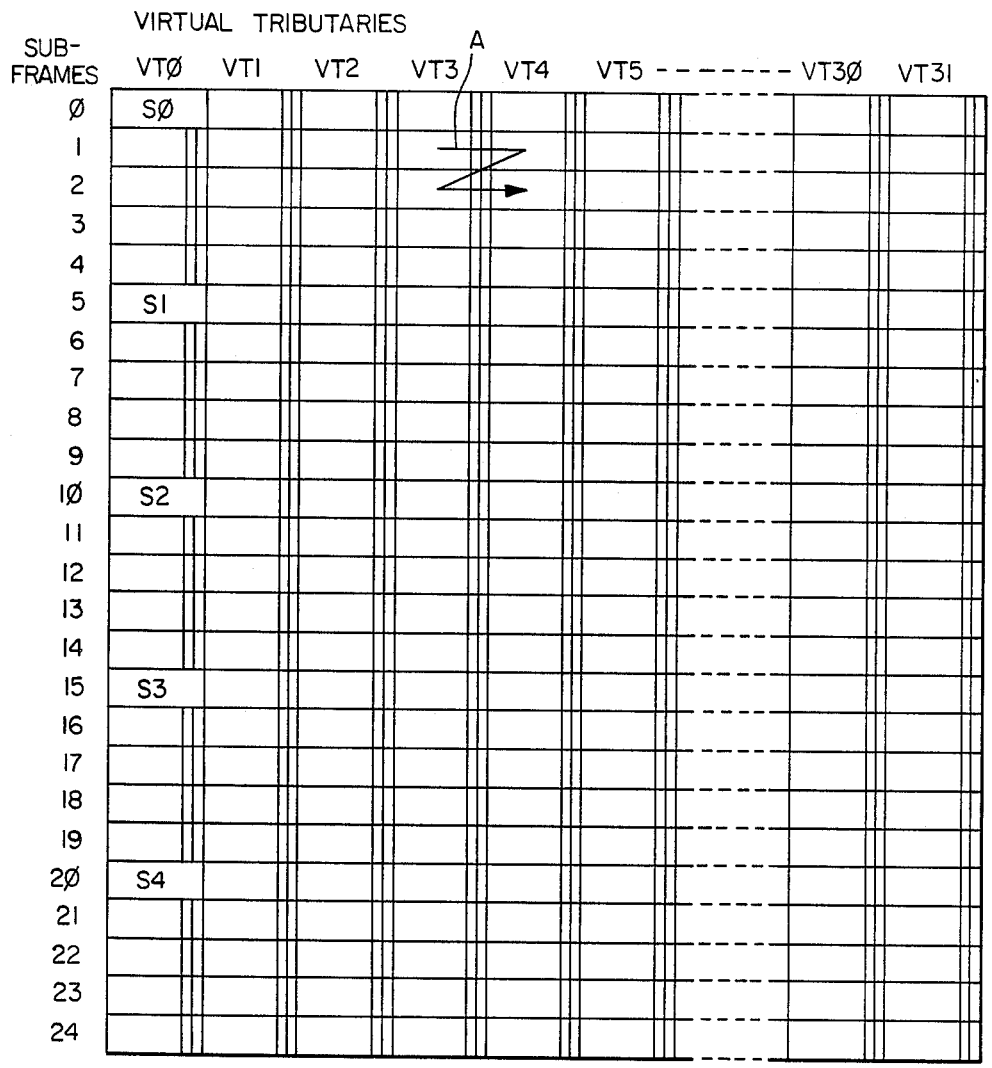
FIG. 5 illustrates one multiplex frame of 32 virtual tributaries multiplexed together, each virtual tributary corresponding to a respective further modified bit stream of the form shown in FIG. 4.

In the same manner that in FIG. 2 the channel CH.0, which contains information replacing the framing bit F in FIG. 1 and hence is referred to as a synchronizing channel, is made the same size as each of the other channels CH.1 to CH.24, so in FIG. 5 the tributary VT0 contains synchronizing information for the frame of virtual tributaries VT0 to VT31 and is made the same size as each of the other tributaries VT1 to VT31. A harmonic relationship is thereby maintained. As shown in FIG. 5, there are 32 virtual tributaries each comprising 25 channels each 10 bits wide, for a total of 8000 bits per frame (an integral multiple of the 250 bits per virtual tributary) with a frame period of 125 μs, and hence with a bit rate of 64 Mb/s which is a harmonic of the virtual tributary bit rate of 2 Mb/s.

An arrow A in FIG. 5 indicates the sequence in which the virtual tributaries are multiplexed. As the channel numbers of the channels in different virtual tributaries need not be aligned (as discussed further below), FIG. 5 refers to subframes 0 to 24 rather than to channels as described above. As indicated by the arrow A, each 125 μs frame comprises 25 5 μs subframes, and in each subframe one word is multiplexed in sequence from each of the virtual tributaries VT0 to VT31 in sequence.

Figure 6:
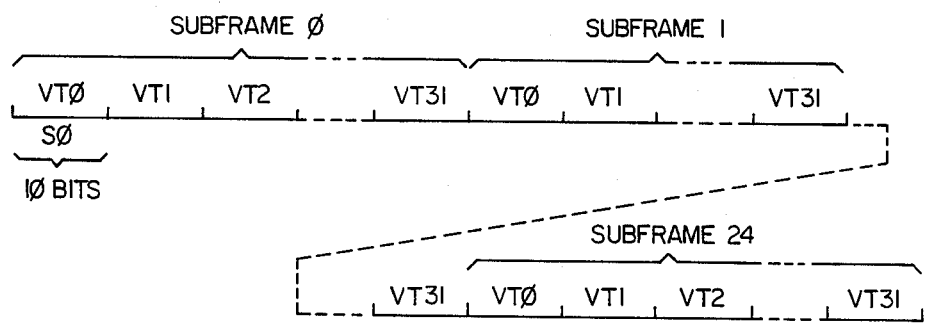
FIG. 6 illustrates the multiplex frame shown in FIG. 5 in a more conventional manner.

In order to ensure a full understanding of the illustration in FIGS. 5, 6 illustrates the same multiplex frame in a more conventional manner. Thus FIG. 6 likewise shows the overall 125 μs frame divided into 25 5 μs subframes 0 to 24, each subframe comprising 10-bit words interleaved in sequence, one from each of the 32 virtual tributaries VT0 to VT31.

As explained above, the virtual tributary VT0 contains synchronizing information, this information enabling the start of each 125 μs frame, and hence the synchronization of the frames, to be determined. Accordingly, as shown in FIGS. 5 and 6, the tributary VT0 contains in the subframe 0 a 10-bit synchronizing word S0 which identifies the start of each frame. As this synchronizing word S0 may generally be replicated by bit sequences occurring elsewhere in the overall frame and which may recur at the frame rate, the tributary VT0 desirably also includes other synchronizing words, different from the word S0 so that the start of each frame can be uniquely identified, in other subframes of the frame. It is considered unnecessary to provide synchronizing words in all subframes of the tributary VT0, i.e. at a rate of one synchronizing word every 5 μs. Instead, as shown in FIG. 5, synchronizing words S1 to S4 are provided in the subframes 5, 10, 15, and 20 of the tributary VT0, whereby one of the synchronizing words S0 to S4 occurs every 25 μs. This enables the frame synchronization to be rapidly and reliably determined, with a high degree of confidence being quickly established.

The synchronizing words S1 to S4 may be the same as or different from one another, provided that the start of the frame is uniquely determined by the synchronizing word S0. Although as illustrated and described above the synchronizing words S0 to S4 each have 10 bits, they may instead be 8-bit words, leaving bits 9 and 10 free for convenience or for other purposes.

As shown in FIG. 5, this synchronizing arrangement leaves the tributary VT0 free during 20 of the 25 subframes of each frame, so that it can be used for other purposes during these subframes. Such other purposes may include, for example: the provision of a cyclic redundancy check code word, in each case for the previous frame, for example in subframe 1 of VT0; the provision of 64 kb/s order wire channels for example in subframes 2 and 3 of VT0; and the provision of network data channels in the other subframes of VT0.

Figure 7:
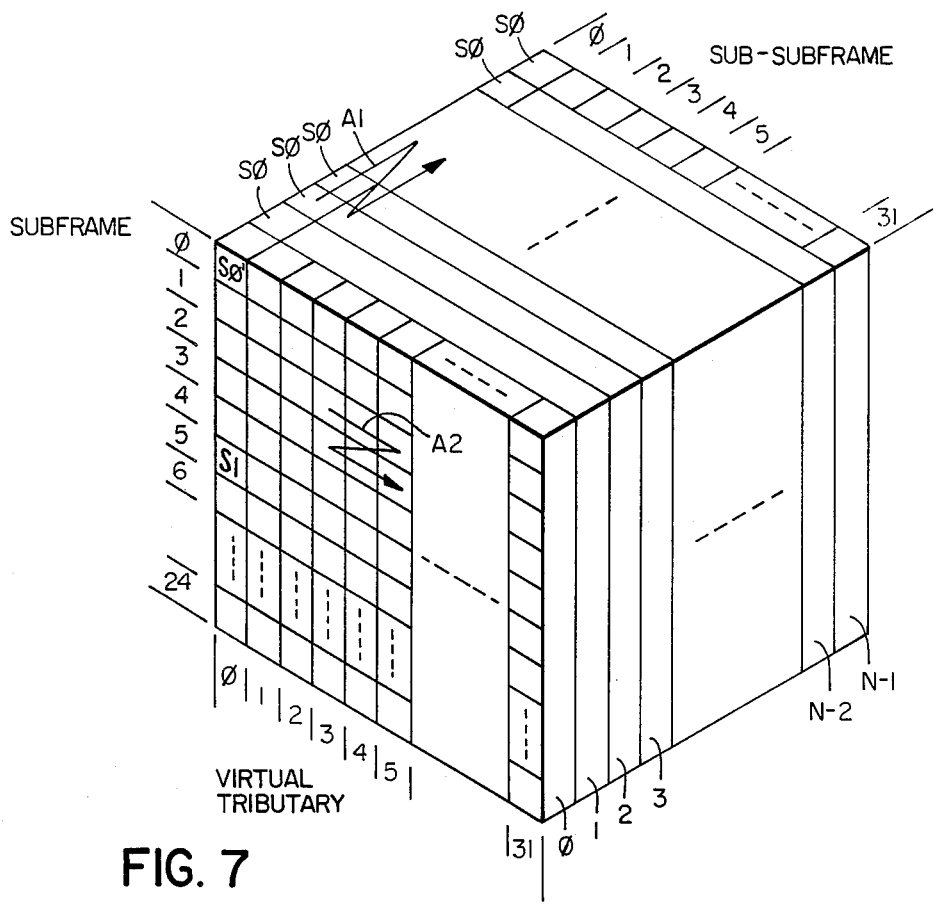
FIG. 7 illustrates a multiplex frame comprising N frames as shown in FIG. 5 multiplexed together on a word-interleaved basis.
Figure 8:
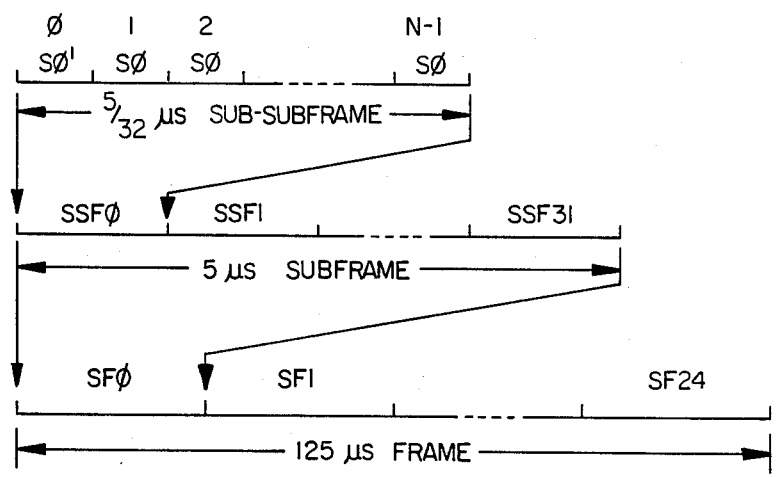
FIG. 8 is an alternative illustration of the multiplex frame of FIG. 7.

The multiplexing principles described above can be further applied to the frame of FIG. 5 to provide a higher bit-rate multiplexed frame (and if desired can be applied reiteratively thereafter to provide successively higher bit-rate multiplexed frames, although this is probably unnecessary or not practical in view of the high bit rates involved), as shown by FIG. 7. Thus whereas FIGS. 3 and 4 illustrate a columnar or one-dimensional frame structure, and in FIG. 5 a plurality of these are multiplexed together and illustrated by a square or two-dimensional frame structure, so a plurality of these may be multiplexed together and illustrated by a cubic or three-dimensional frame structure. For the sake of clarity in FIG. 7 the individual bits of the multiplexed words are not represented, it being understood that the multiplexing is effected word by word in the same manner as described above in respect of FIG. 5. FIG. 8 shows the same multiplex frame as FIG. 7, in an alternative form.

FIG. 7 illustrates an arbitrary number N (for example N=32) of frames, each as illustrated in FIG. 5, numbered 0 to N−1, which are multiplexed together and hence are illustrated as being stacked one behind another to form the cubic frame structure described above. An arrow A1 indicates the sequence of multiplexing words from these N frames, one word from each of the N frames being interleaved on a word-by-word basis in a respective sub-subframe. An arrow A2 on a front face of the cubic structure illustrates the sequence of multiplexing the sub-subframes together, this corresponding to the arrow A in FIG. 5. Thus each sub-subframe consists of interleaved words, one from each of the N frames, or planes in FIG. 7.

This is further illustrated in FIG. 8, which also shows the durations of the frame, subframes, and sub-subframes, respectively 125 μs, 5 μs, and 5/32 μs. Within each sub-subframe there are N interleaved words. With N=32 and 10 bits per word, the bit rate of the multiplexed frame becomes 2.048 Gb/s, a harmonic of the 64 Mb/s bit rate for the frame of FIG. 5.

As illustrated in FIG. 7 and FIG. 8, the initial multiplexing of words in sub-subframe 0 of subframe 0 of each frame results in interleaving of the synchronizing words S0 of the N planes. In order to identify one of these as the start of the frame (cube) and make it distinct from the others, this first synchronizing word is made different from the other synchronizing words in this sub-subframe, and accordingly is designated S0' in FIGS. 7 and 8.

Having described the above multiplex frame structures in detail, advantages of them can now be explained in a relatively simple manner. These advantages arise directly from the harmonic structuring of the frames.

Firstly, it should be appreciated that DS-0 (64 kbps) channels can be mapped into, and hence transmitted as, channels within any virtual tributary, either individually to provide 64 kbps services or collectively to provide services at integral multiples of this bit rate. Similarly, conventional DS-1 channels can be mapped into synchronous DS-1 channels, or complete virtual tributaries. DS-1C (3.152 Mb/s), DS-2 (6.312 Mb/s), and DS-3 (44.736 Mb/s) channels can each be mapped into an appropriate number of virtual tributaries and transmitted asynchronously, or can be demultiplexed to DS-1 channels and transmitted accordingly. DS-3 channels in the Syntran format, in which there are 672 time slots in each master frame, can be mapped into 28 of the 31 non-synchronizing virtual tributaries of a frame as shown in FIG. 5, leaving 3 virtual tributaries free to carry other traffic, transmitting 24 bytes and one frame word in each virtual tributary.

Now a main advantage of the multiplex format becomes apparent: If a signal multiplexed for example as shown in FIGS. 7 and 8 is sampled at a regular and periodic rate every 5/32 μs (the sub-subframe period), taking one word on each sample, this yields a signal in the multiplex format of FIGS. 5 and 6; if the same signal multiplexed as shown in FIGS. 7 and 8 is instead sampled at a regular and periodic rate every 5 μs (the subframe period), again taking one word on each sample, this yields a signal in the format of FIG. 4, i.e. a single virtual tributary or synchronous DS-1 signal; and if this same signal multiplexed as shown in FIGS. 7 and 8 is instead sampled at a regular and periodic rate every 125 μs (the frame period), again taking one word on each sample, this yields a single DS-0 or 64 kbps channel. Correspondingly, a signal multiplexed in the format of FIGS. 5 and 6 can be sampled at a regular and periodic rate every 5 μs (the subframe period) or 125 μs (the frame period), taking one word on each sample, to yield respectively one virtual tributary or one DS-0 channel.

Thus it should be appreciated that the multiplex formats described above enable individual channels at different levels (e.9. DS-0, synchronous DS-1) to be directly accessed in the multiplexed bit stream, in an easy and convenient manner as a result of their periodicity, without any need for demultiplexing and subsequent remultiplexing. In addition, the periodic nature of the individual channels facilitates their switching collectively in groups to provide services which have bandwidths which are arbitrary integral multiples of 64 kb/s.

In order to switch or otherwise handle virtual tributaries by sampling the multiplexed signal with a regular period of 5 μs as described above, it is not necessary to be aware of the distribution of DS-0 channels within the virtual tributary. In other words, the synchronizing channel CH.0 of the virtual tributary does not have to be aligned so that it occurs in subframe 0, but rather it can be allowed to occur in any of the subframes 0 to 24 for any individual virtual tributary. Alignment of the synchronizing channel CH.0 to occur in subframe 0, and hence knowledge of the relative positions of the DS-0 channels within the virtual tributary, only becomes necessary when the virtual tributary must be demultiplexed to the DS-0 level.

Thus individual virtual tributaries can be processed through various numbers of switching stages, with arbitrary positions of their synchronizing channels CH.0 in the subframes 0 to 24 in the transmission of multiplexed signals between the switching stages. However, the final demultiplexing of the virtual tributary into constituent DS-0 channels necessitates information as to which of the 25 subframes contains the synchronizing channel CH.0. This information is conveyed, in this embodiment of the invention, in the bit 9 position of the channels in the virtual tributary.

This is explained in further detail with reference to FIG. 9, which illustrates a virtual tributary having an arbitrary relationship of its channels CH.0 to CH.24 to the subframes 0 to 25 of a multiplexed signal which can include this virtual tributary in the manner shown in any of FIGS. 5 to 8.

Figures 9, 10:
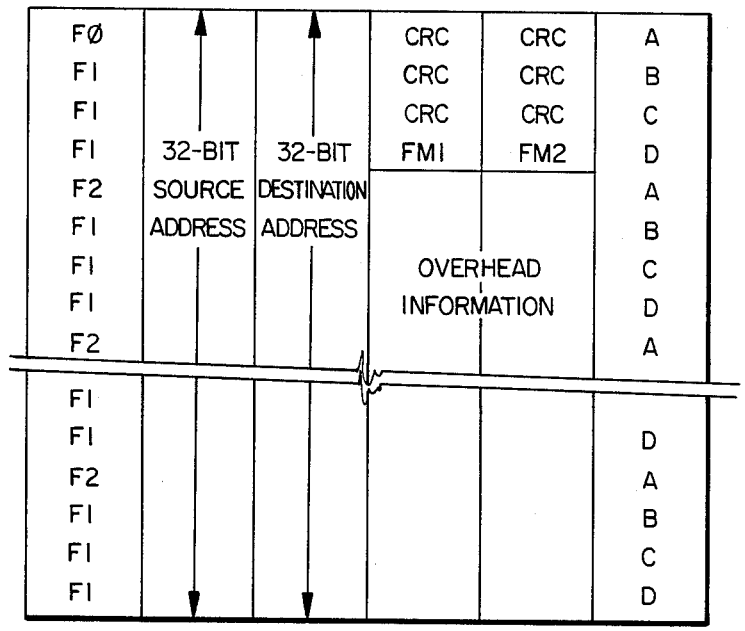
FIG. 9 illustrates a virtual tributary in more detail.
FIG. 10 illustrates one frame of service-related overhead information for a DS-0 channel.

Referring to FIG. 9, each word of the virtual tributary is assumed in this case to have 10 bits, the tenth bit in each word being indicated as a parity bit P for the word, whereby each word can be checked individually for the integrity of its data. The synchronizing channel CH.0 is identified, in this example, by always having a 0 bit as the ninth bit of each word. Each of the other, information, channels CH.1 to CH.24 contains a bit B as the ninth bit, the bit B being 1 for each one of these channels at least some of the time. Initially it is assumed here that the bit B is 1 for each of the information channels CH.1 to CH.24 in each frame, whereby a single 0 in the ninth bit position of a word uniquely identifies the synchronizing channel CH.0.

The conventional DS-1 bit stream shown in FIG. 1 is conveniently mapped into the virtual tributary shown in FIG. 9 in that the 8 bits from each of the channels CH.1 to CH.24 in FIG. 1 become the first eight bits 1-8 of the corresponding channels CH.1 to CH.24 in FIG. 9, and the framing bit F in FIG. 1, whose binary value changes in accordance with a known framing pattern, can become one of the bits 1-8 of the synchronizing channel CH.0 in FIG. 9 to preserve this framing pattern. The other seven of the bits 1-8 of the synchronizing channel CH.0 can be used if desired for other purposes, such as for indicating bipolar violations, frame slips, alarm conditions, and signalling frames.

Whilst this arrangement is effective in enabling the synchronizing channel CH.0 to be readily determined, it makes relatively poor use of the capacity of the ninth bit in each word. In addition, no provision, other than known bit stealing techniques, is made for transmitting signalling information. Signalling information can be transmitted by providing a further additional bit for each channel (i.e. 11 bits per word) and using this to transmit the signalling information redundantly, a signalling bit in this eleventh bit position of each channel being repeated in each case for 6 125 μs frames. Alternatively, the tenth bit may be used in the same manner for carrying signalling information, instead of being used as a parity bit as described above. Neither of these arrangements is particularly advantageous.

In order to improve this situation in an advantageous manner, to provide clear 64 kbps information channels (no bit stealing) and facilitate the transmission of both signalling information and other information which may be desired for example for controlling and verifying information channels, advantageously the ninth bit of each word, i.e. the bit B, is used to provide a service-associated overhead channel in a manner such as that described below, whereby each bit B is variably 1 and 0, and hence is 1 at least some of the time. The ninth bit of the synchronizing channel CH.0 remains 0 in every frame, so that it can still be properly distinguished from the other bits B, within a few frames using known synchronizing techniques.

FIG. 10 illustrates one manner in which the bit B, or ninth bit position, of an individual information channel can be conveniently used to transmit signalling and other service-related information.

As shown in FIG. 10, information constituted by the bit B is framed in frames each of 6×32=192 bits. As the 64 kbs channel or service to which this information relates has, as described, one bit B in each 125 μs frame, each bit B frame as shown in FIG. 10 has a frame period of 192×125 μs or 24 ms. The bit B frame in FIG. 10 is illustrated for convenience as six columns of 32 bits, the six columns corresponding to the fact that a signalling bit can occur in every sixth frame. Thus in FIG. 10 bits in adjacent columns and the same row occur 125 μs apart, and bits in the same column and adjacent rows occur 6×125 μs apart. The overall bandwidth provided for each 64 kbps service by the bits B is 1 bit every 125 μs frame, or 8 kbps.

In the first column of FIG. 10, bits F0, F1, and F2 identify the bit B framing structure, and correspondingly the signalling frame structure. The bit F0 is 0 representing the start of a bit B frame, each bit F1 is 1, and the bits F2 can be 0 or can define a pattern of 1's and 0's. As the signalling frame structure and the bit B frame structure are synchronized, and as a signalling frame occurs every 6 125 μs frames, the sixth column in FIG. 10 corresponds to the signalling frames and the bit B is used to represent the A, B, C, and D signalling bits.

The second and third columns in FIG. 10 indicate that the bit B in the respective frames can be used to represent 32-bit source and destination addresses respectively, identifying unique addresses for stations respectively originating and terminating a connection. These addresses facilitate end-to-end checking of the connection. The bits in columns four and five in FIG. 10 provide for 6 CRC (cyclic redundancy code) check bits, which can be used to carry a CRC for the previous bit B frame (on the same service or channel) for checking the integrity of data; two format bits FM1 and FM2 which constitute a 2-bit code (for example 00) representing the format shown in FIG. 10, which can be changed to represent different formats; and 56 overhead information bits. The overhead information bits can be used for service control and/or verification, for example for requesting and confirming a minimum error rate and maximum delay for the service, indicating failures, and so on.

The above description relates merely to one example of the manner in which the ninth or B bit may be used for each service or 64 kbps channel to provide service-related overhead information, and many other ways of transmitting this information using such a bit can be devised. For example, an overhead information packet structure may instead be assigned to the information in this ninth bit position. Furthermore, rather than providing a parity bit P for every word as described above using bit 10, this bit may be dispensed with and the integrity of the data can be checked using parity over a much larger, or using a CRC check over a very much larger, block of information, and transmitting the parity or CRC check bits in the service-related overhead information in the ninth or B bit.

In any event, it should be appreciated that the B bit will in these cases be variably 1 and 0, so that the B bits of the information channels CH.1 to CH.24 are distinguishable from the ninth bit of the synchronizing channel CH.0 which is always 0 (in this example), whereby for each virtual tributary the synchronizing channel CH.0 can be identified regardless of its position relative to the frame structure of FIGS. 5 to 8.

It is also observed that the synchronizing channel CH.0 can alternatively be identified in known manner by providing in this channel a predetermined word or bit sequence, which is detected with a degree of confidence that this is in fact the synchronizing channel being built up over a plurality of frames using a so-called confidence register.

Figure 11:
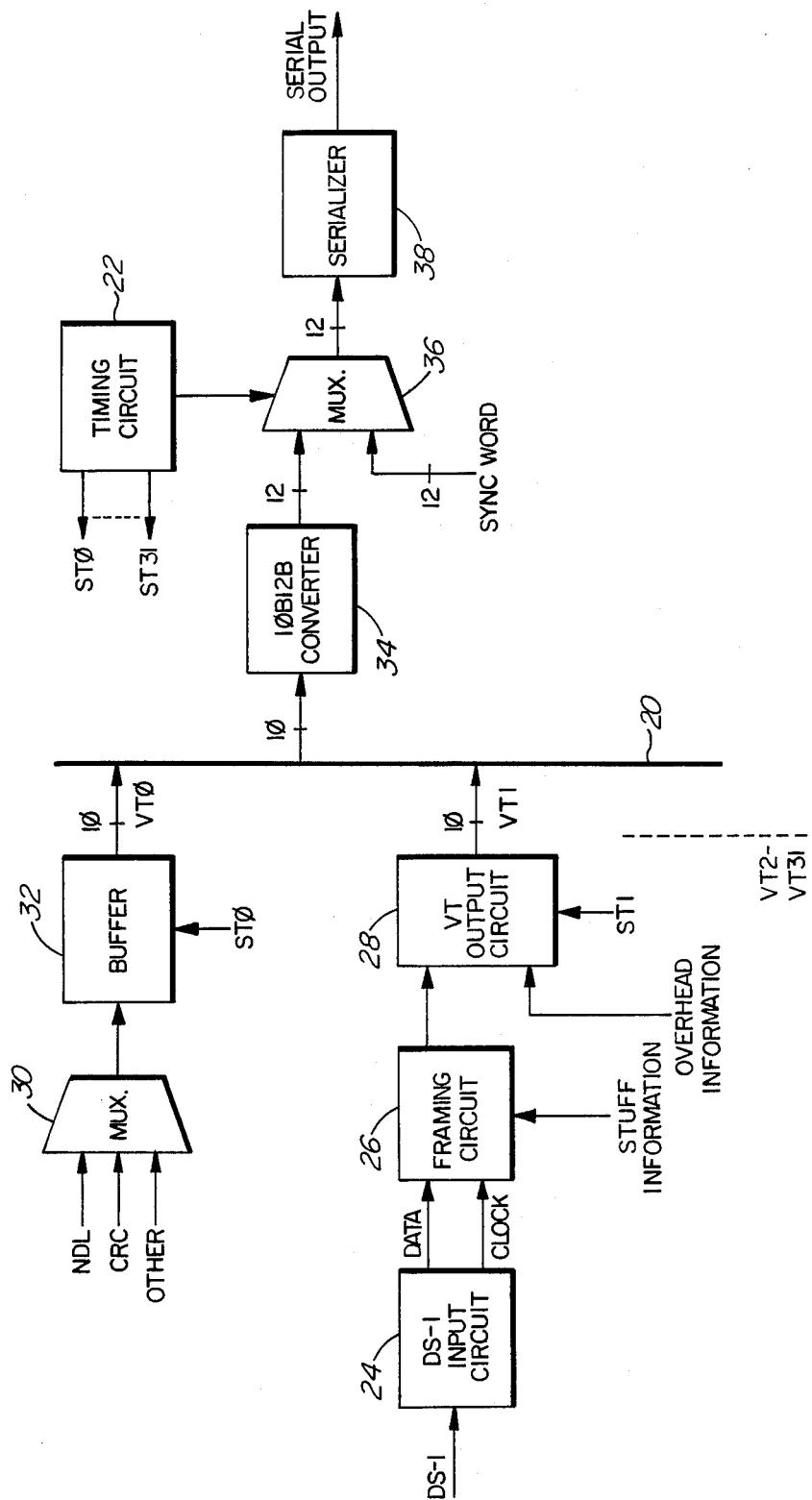
FIG. 11 schematically illustrates a circuit arrangement for producing and multiplexing virtual tributaries to form multiplex frames as shown in FIG. 5.

By way of further explanation, FIG. 11 illustrates a circuit arrangement which may be used for producing a multiplexed bit stream having multiplex frames of the form described above.

Referring to FIG. 11, there is illustrated a 10-bit wide data bus 20 to which 10-bit wide words of the virtual tributaries VT0 to VT31 are supplied cyclically in turn under the control of strobe signals ST0 to ST31 respectively supplied by a timing circuit 22. In FIG. 11 circuitry is shown only for the virtual tributaries VT0 and VT1, circuitry for each of the tributaries VT2 to VT31 being similar to that for the tributary VT1.

For producing the virtual tributary VT1 from an incoming DS-1 bit stream, the circuitry for this tributary includes a DS-1 input circuit 24, a framing circuit 26, and a virtual tributary output circuit 28. In the input circuit 24 the DS-1 bit stream is converted from a bipolar signal into a unipolar signal and the 1.544 MHz clock signal is recovered, the data and clock signals being supplied to the framing circuit 26. In the framing circuit 26 the DS-1 frame timing is determined and the framing bit F (FIG. 1) is stuffed with an additional 7 bits to form the 8 bits of the synchronizing channel CH.0 (FIG. 2), so that the bit rate is increased from 1.544 MHz to 1.6 MHz. In the VT output circuit 28 this serial data is converted to 8-bit parallel form by a serial-to-parallel converter, the overhead information is supplied as the ninth bit, and a parity bit is determined and added as a tenth bit, to produce a virtual tributary of the form shown in FIG. 9.

The virtual tributary VT0 is produced by multiplexing together the signals of this tributary, for example network data link signals (NDL), CRC signals (CRC), and other desired signals (OTHER), in a multiplexer 30 and buffering these in a buffer 32 whose output is controlled by the strobe signal ST0. As already explained, the strobe signals ST0 to ST31 are phased to supply the words of the tributaries VT0 to VT31 in turn, word-interleaved, to the bus 20.

In the circuit arrangement illustrated in FIG. 11, for convenience of transmission the 10-bit words from the bus 20 are converted into 12-bit words for transmission by a 10B12B converter 34 in accordance with a desired line coding scheme. In a multiplexer 36 controlled by the timing circuit 22, the synchronizing word S0 is inserted in the resulting 12-bit wide stream at the start of each multiplex frame. Although not illustrated in FIG. 11 for the sake of clarity, the synchronizing words S1 to S4 can be similarly provided in the word stream at appropriate times under the control of the timing circuit 22. In this manner each synchronizing word can be selected to be a clearly identifiable 12-bit word which does not occur in a normal data stream, thereby facilitating the subsequent recovery of synchronizing information. As an alternative, the synchronizing words S0 to S4 may be supplied to the multiplexer 30 for incorporation in the tributary VT0 information; this procedure in particular may be used in the event that only the 10-bit wide data is transmitted without any line coding, the converter 34 and multiplexer 36 in this case being dispensed with. In any event, the parallel data is subsequently converted to serial data by a serializer 38, from which it is forwarded as a serial output bit stream.

Whilst particular embodiments of the invention have been described in detail above, it should be understood that numerous modifications, variations, and adaptations may be made thereto without departing from the scope of the invention as defined in the claims.

What is claimed is:

1. A method of multiplexing digital signals comprising the steps of:
providing t.d.m. frames each consisting of mn time slots each for one bit, where m and n are plural integers, said frames comprising n consecutive time slots for each of m channels; and, in each frame:
in a predetermined one of the n time slots for one of the m channels, providing a bit indicating that the channel is a frame synchronizing channel, whereby this frame synchronizing channel is distinguishable from information channels constituted by the other m−1 channels; and
providing digital signals in the other n−1 time slots of the m−1 information channels.

2. A method as claimed in claim 1 wherein said bit provided in each frame in the predetermined one of the n time slots of the frame synchronizing channel has a predetermined binary value.

3. A method as claimed in claim 2 and including the step of providing in each frame in the predetermined one of the n time slots of each information channel a bit having a value different from said predetermined binary value.

4. A method as claimed in claim 3 and including the step of providing in each frame a signalling information bit in a further one of the n time slots of each information channel.

5. A method as claimed in claim 2 and including the step of providing, in successive frames in the predetermined one of the n time slots of each information channel, bits of both binary values constituting overhead information for the respective information channel.

6. A method as claimed in claim 5 wherein the overhead information for each information channel provides one bit every six frames for signalling information relating to the information channel.

7. A method as claimed in claim 5 wherein the overhead information for each information channel comprises bits in overhead information frames, each overhead information frame having a period which is an integral multiple of the period of six of said t.d.m. frames.

8. A method as claimed in claim 1 and further comprising the step of providing information in each frame in the other n−1 time slots of the frame synchronizing channel.

9. A method as claimed in claim 8 wherein the information provided in each frame in the other n−1 time slots of the frame synchronizing channel comprises signalling frame information.

10. A method as claimed in claim 1 wherein the t.d.m. frames each have a period of 125 $\mu$s.

11. A method as claimed in claim 10 wherein m=25.

12. A method as claimed in claim 11 wherein n>8.

13. A method as claimed in claim 12 wherein n=9.

14. A method as claimed in claim 12 wherein n=10.

15. A method as claimed in claim 12 and including the step of providing a parity bit for each information channel in each frame in a predetermined one of the other n−1 time slots of the respective information channel.

16. A method as claimed in claim 12 wherein in each frame 8 bits of a 64 kbps channel are provided in 8 of said other n−1 time slots of at least one of the m−1 information channels.

17. A method of multiplexing digital signals comprising the steps of:
providing p virtual tributaries each comprising t.d.m. frames of information multiplexed in accordance with the method of claim 1, where p is a plural integer, all of the virtual tributaries having the same t.d.m. frame period and the same number mn of time slots for m words, one per channel, each of n consecutive bits;
providing a predetermined synchronizing word as a predetermined one of the m words of a predetermined one of the virtual tributaries constituting a synchronizing information tributary; and
multiplexing the p virtual tributaries together, one word from each virtual tributary cyclically in turn, to form a multiplexed superframe of word-interleaved virtual tributaries.

18. A method as claimed in claim 17 wherein a plurality of synchronizing words are provided in the synchronizing information tributary.

19. A method as claimed in claim 18 wherein the synchronizing information tributary comprises a number of different synchronizing words which is an integral factor of m, the synchronizing words being distributed periodically among the m words of the synchronizing information tributary.

20. A method as claimed in claim 18 wherein the synchronizing information tributary comprises five synchronizing words.

21. A method as claimed in claim 17 wherein p=32.

22. A method of multiplexing digital signals comprising the steps of:
providing a plurality of multiplexed superframes of word-interleaved virtual tributaries multiplexed in accordance with the method of claim 17;
modifying the predetermined synchronizing word of a predetermined one of the multiplexed superframes whereby it is distinguishable from the other synchronizing words; and
multiplexing the multiplexed superframes together, one word from each multiplexed superframe cyclically in turn.

23. A method of multiplexing comprising the steps of:
multiplexing in a t.d.m. frame an n-bit word of each of a frame synchronizing channel containing synchronizing information and m−1 digital signal channels to form a tributary channel having mn bits in each t.d.m. frame period; and
multiplexing in a t.d.m. subframe an n-bit word of each of a tributary synchronizing channel, also having mn bits in each t.d.m. frame period, and p−1 tributary channels to produce a multiplexed signal having pn bits in each t.d.m. subframe and m subframes in each t.d.m. frame period;
where n, m, and p are plural integers.

24. A method as claimed in claim 23 wherein the t.d.m. frame period is 125 microseconds.

25. A method as claimed in claim 23 and further comprising the step of multiplexing in a t.d.m. sub-frame an n-bit word of each of q of said multiplexed signals to produce a further multiplexed signal having qn bits in each t.d.m. sub-frame and p sub-subframes in each t.d.m. subframe, where q is a plural integer.

26. A method as claimed in claim 25 wherein the t.d.m. frame period is 125 microseconds.

* * * * *